(12) United States Patent
Kloeppel et al.

(10) Patent No.: US 6,183,135 B1
(45) Date of Patent: Feb. 6, 2001

(54) SINGLE PLATE HYDRODYNAMIC BEARING WITH SELF-BALANCING FLUID LEVEL AND FLUID CIRCULATION

(75) Inventors: Klaus Kloeppel, Watsonville; Anthony Aiello, Aptos; Peter R. Riegler, Coronado, all of CA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/273,234

(22) Filed: Mar. 18, 1999

Related U.S. Application Data

(60) Provisional application No. 60/078,658, filed on Mar. 19, 1998.

(51) Int. Cl.[7] .................................................. F16C 32/06
(52) U.S. Cl. .......................................... 384/112; 384/113
(58) Field of Search ................................ 384/107, 112, 384/113, 130

(56) References Cited

U.S. PATENT DOCUMENTS

| | | | |
|---|---|---|---|
| 4,445,793 | * 5/1984 | Shinohara | 384/130 |
| 5,370,463 | * 12/1994 | Asada et al. | 384/113 |
| 5,427,456 | * 6/1995 | Hensel | 384/112 |
| 5,433,529 | * 7/1995 | Hensel | 384/112 |
| 5,504,637 | * 4/1996 | Asada et al. | 384/107 X |
| 5,516,212 | * 5/1996 | Titcomb | 384/107 |
| 5,658,080 | * 8/1997 | Ichiyama | 384/112 |
| 5,885,005 | * 3/1999 | Nakano et al. | 384/113 |
| 5,988,886 | * 11/1999 | Takahashi | 384/107 |

* cited by examiner

*Primary Examiner*—Charles A Marmor
*Assistant Examiner*—Ha Ho
(74) *Attorney, Agent, or Firm*—Flehr Hohbach Test Albritton & Herbert LLP

(57) ABSTRACT

A shaft having a thrust plate at or near one end, and a sleeve cooperating with the shaft to define one or more journal bearings and a counterplate (which may be supported by the sleeve or defined by the sleeve) defining at least one counter thrust surface in cooperation with the thrust plate. In order to maintain an enhanced fluid distribution across the journal bearing and maintain pressure distribution boundary conditions as desired, one or more grooves are defined along the shaft extending behind or between the thrust plate and the shaft. The grooves typically extend from one radial side of the thrustplate behind the thrustplate and up to a point on the shaft adjacent or nearly adjacent to one of the journal bearings. Alternatively, the slot or slots may extend to a point between two journal bearings. In this way, the pressure from the distal axial surface of the thrust bearing to the point where the slot terminates is equalized, enhancing the stability of the boundary conditions over each of the journal bearings and equalizing the pressure at the opposite ends of the fluid distribution slot.

13 Claims, 3 Drawing Sheets

O = bearing

SINGLE PLATE HYDRODYNAMIC BEARING WITH SELF-BALANCING FLUID LEVEL AND FLUID CIRCULATION

CROSS-REFERENCE TO A RELATED APPLICATION

This application is based on U.S. Provisional Patent Application Ser. No. 60/078,658, filed on Mar. 19, 1998. The priority of this provisional application is hereby claimed and is incorporated herein by reference.

FIELD OF THE INVENTION

The present invention relates to the field of hydrodynamic bearing assemblies of the type which provide support and rotation for high speed spindle elements. More specifically, the present invention relates to hydrodynamic bearing assemblies with a simplified fluid circulation scheme.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub which maintaining accurate alignment of the spindle to the shaft. The bearings themselves are normally lubricated by grease or oil.

The conventional bearing system described above is prone, however, to several shortcomings. First is the problem of vibration generated by the balls rolling on the raceways. Ball bearings used in hard disc drive spindles run under conditions that generally guarantee a physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the data track density and the overall performance of the disc drive system.

Another problem is related to the application of hard disk drives in portable computer equipment and the resulting requirements in shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid-either gas or liquid-functions as the actual bearing surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems.

Thus, in the case of a hydrodynamic bearing employing a liquid lubricant, the lubricating fluid and its components must be sealed within the bearing to avoid loss of lubricant which results in reduced bearing load capacity. Loss of a seal or failure to control the fluid level within the bearing system could cause contamination of the hard disk drive with lubricant particles and droplets as well as outgassing-related condensation particles.

Many earlier hydrodynamic bearings incorporated a reservoir extending up the central axis of the shaft and connected by cross-bores to the journal bearing. However, this design was impeded by lubricant thermal expansion issues, leading to a search for an alternative approach.

Therefore, a design for establishing and maintaining fluid distribution over a bearing surface remains highly desirable.

SUMMARY OF THE INVENTION

Therefore, it is an objective of the present invention to provide a hydrodynamic bearing which is simple in construction and whose design is highly scalable.

A further objective of the invention is to provide a hydrodynamic bearing in which the fluid level and pressure distribution across the surface of the journal bearing and/or thrust bearing is stable and easily maintained.

Another objective of the invention is to provide a hydrodynamic bearing in which the lubricant thermal expansion issue in the overall bearing design is minimized.

Another objective of the invention is to provide a hydrodynamic bearing design including a shaft and a thrust plate wherein the pressure distribution across the journal bearing on the shaft and across the thrust bearings is maintained, while providing a lower cost implementation of the design.

Another objective of the invention is to provide a bearing design with optimized boundary conditions between the various bearing sections to optimize the fluid distribution and insensitivity to temperature and machining tolerances, thereby providing a greater consistency of dynamic performance of the invention.

In summary, the present invention incorporates a shaft having a thrust plate at or near one end, and a sleeve cooperating with the shaft to define one or more journal bearings and a counterplate (which may be supported by the sleeve or defined by the sleeve) defining at least one counter thrust surface in cooperation with the thrust plate. In order to maintain an enhanced fluid distribution across the journal bearing and maintain pressure distribution boundary conditions as desired, one or more grooves are defined along the shaft extending behind or between the thrust plate and the shaft. The grooves typically extend from one radial side of the thrustplate behind the thrustplate and up to a point on the shaft adjacent or nearly adjacent to one of the journal bearings. Alternatively, the slot or slots may extend to a point between two journal bearings. In this way, the pressure from the distal axial surface of the thrust bearing to the point where the slot terminates is equalized, enhancing the stability of the boundary conditions over each of the journal bearings and equalizing the pressure at the opposite ends of the fluid distribution slot.

Other features and advantages of the present invention will become apparent to a person of skill in the art who studies the present description of a preferred embodiment given in conjunction with the accompanying drawings.

DETAILED DESCRIPTION OF A PREFERRED EMBODIMENT

A hydrodynamic bearing which is especially useful in a spindle motor and disc assembly for use in disc drive computer systems is disclosed herein. The special purpose of the present invention is to modify the design of a hydrodynamic bearing for the motor so that the lubrication fluid is properly distributed through the bearing. A further concern is to make the bearing less sensitive to temperature changes. Another concern in the design of a hydrodynamic hard disc drive spindle motor is to make sure that the lubricant or fluid stays confined to the region where it lubricates the rotating surfaces, and cannot migrate toward the regions where the data storing discs are located.

In the following description, numerous specific details are set forth such as material types, thickness, speeds in order to provide a thorough understanding of the invention. It will be obvious, however, to one of skill in the art that these specific details need not be used to practice the present invention. In other instances, well known structures and processing steps have not been described in particular detail in order to avoid unnecessarily obscuring the present invention. Further, the bearing is described as being particularly useful in a spindle motor. However, the bearing is capable of and acceptable to many other uses.

Figure 1:
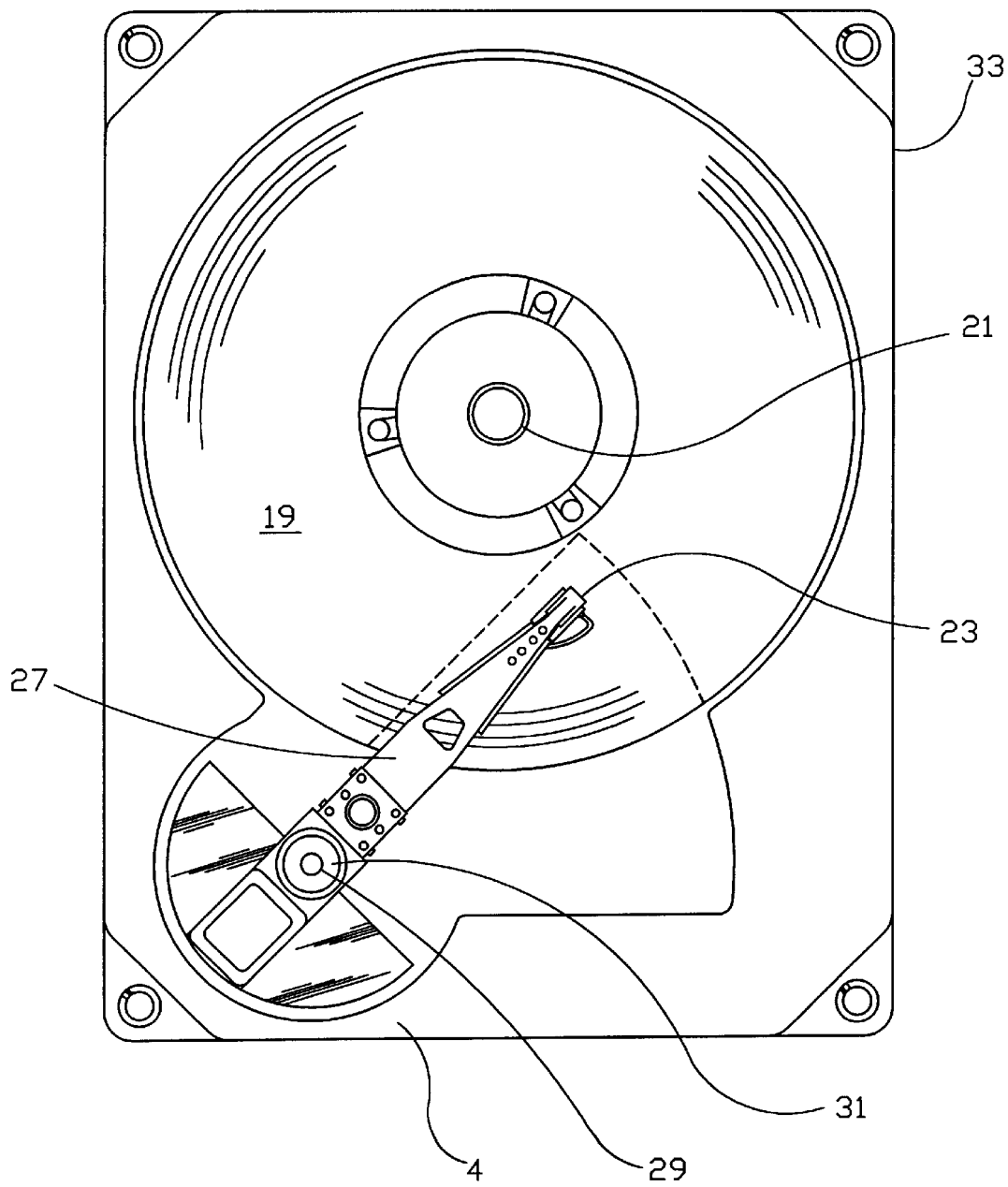
FIG. 1 is a top plan view of a disc drive in which the present invention is useful.

Referring to FIG. 1, this figure is a top plan view illustrating the basic elements of a disc drive including the rotating disc or discs 19 which are rotated by the spindle 21 of a spindle motor (not shown). As the discs rotate, a transducer 23 mounted on the end of an actuator arm 27 is selectively positioned by a voice coil motor 29 rotating about a pivot 31 to move the transducer 23 from track to track over the surface of the disc. All of these elements are mounted in a housing 33 which is typically an air-tight housing to minimize the possibility of any contaminants reaching the surface of the disc. Such contaminants could interfere with the reading and writing of data on the surface of the disc by the transducer, the transducer itself having an extremely fine gap at which reading/writing occurs, and in today's technology flying extremely close to the surface of the disc.

Figure 2:
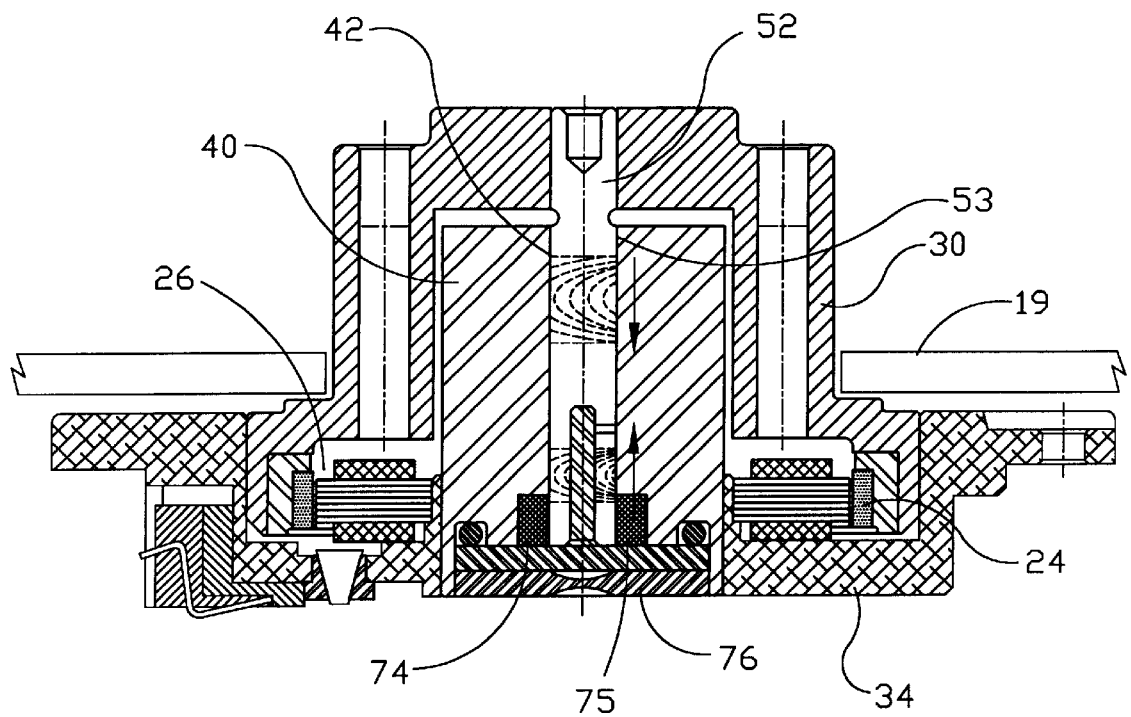
FIG. 2 is a vertical sectional view of a motor incorporating a hydrodynamic bearing of the prior art and in which the present hydrodynamic bearing is useful.

A typical spindle motor for providing constant high-speed rotation to the disc mounted thereon is shown in vertical section in FIG. 2.

FIG. 2 shows a typical spindle motor with a prior art hydrodynamic bearing, with a single disc 19 supported from the spindle or hub 21; obviously a significant number of discs could be supported from the hub of a motor of this type. A magnet 24 is supported on the interior vertical surface of the cavity defining hub element 30. A stator 26 is supported by the sleeve 40 which is adapted to be fitted into a base of the housing 34 at its lower end.

The sleeve 40 is a stationary piece which on its interior surface 42 forms the bushing of the journal bearing. This bushing 42 faces the shaft 52 which is rotating past the fixed bushing.

At the lower end of the rotating shaft 52 near the base of the disc drive, a thrust plate 74 is stepped, pressed or otherwise fixedly supported on the shaft to rotate with the shaft. This plate 74 extends into a recess 75 defined by the lower end of the bushing 42 and the upper surface of counter plate 76. This counter plate 76 to the thrust plate 74 is preferably pressed in place against the lower portion 40 of the sleeve, or sits against a step in the bushing in order to fix its position.

Figure 3:
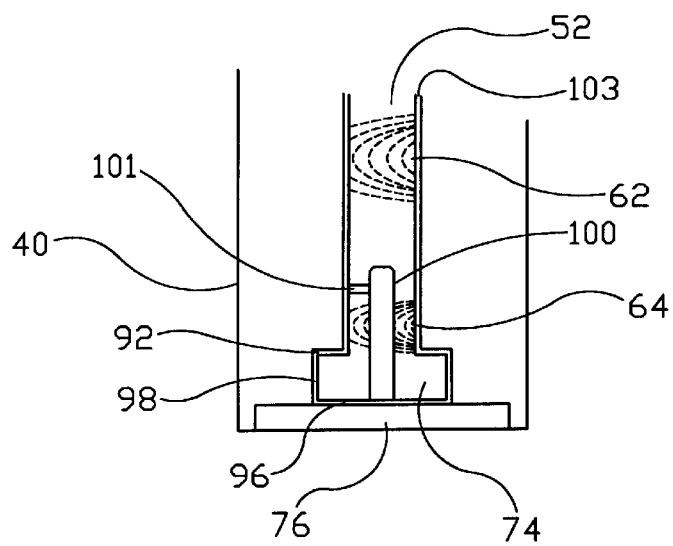
FIG. 3 is a detailed view of a section of the hydrodynamic bearing of the prior art.

The enlarged view of FIG. 3 shows the journal and thrust bearings of the design of FIG. 2. The design includes first and second journal bearings 62 and 64 with the exit bore 101 from reservoir 100 exiting between to provide and maintain fluid in these journal bearings, and to equalize pressure between 62, 64 and 96 bearing boundaries. The thrust bearings comprise the fluid filled gap 92 between bushing 40 and thrust plate 74, and the fluid filled gap 96 between thrust plate 74 and counterplate 76.

Figure 4A:
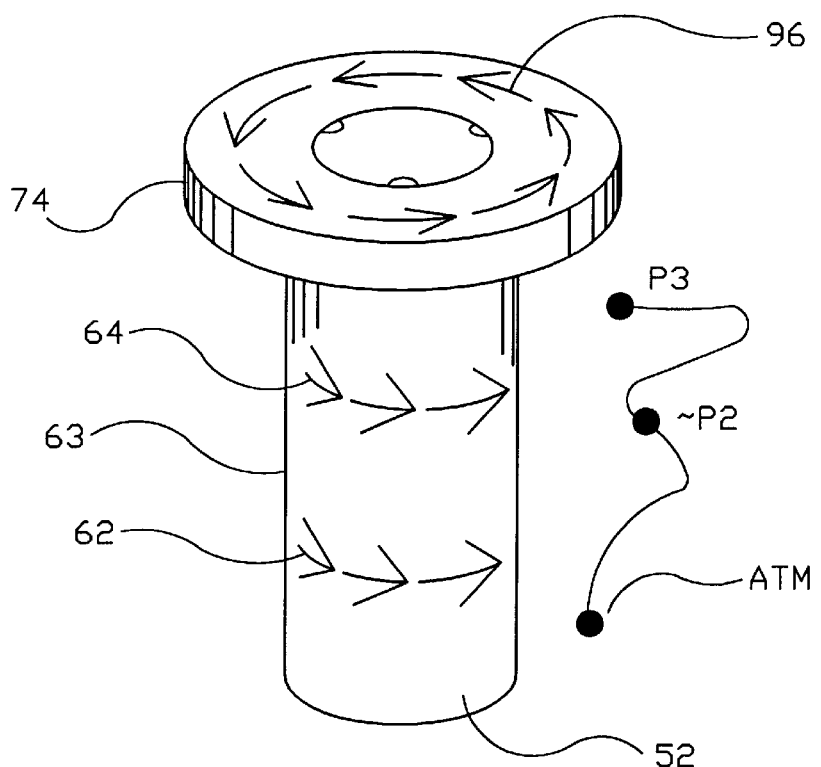
FIGS. 4A and 4B are schematic views illustrating the operating principles of the present invention.

The shaft 52 is supported for rotation within the bushing defined by the sleeve 40 by the herringbone patterns of the journal bearings 62, 64 which are defined on either the outer surface of the shaft or the inner sleeve surface of the bushing. The rotation of the shaft within the sleeves creates pressure distribution along the shaft which prevent it from tilting and allow it to rotate smoothly within the sleeve supported by the fluid which is in the gap 103 between the shaft and the sleeve. As shown, at one end of the shaft atmospheric pressure prevails, with only a capillary seal 53 (see FIG. 2) preventing exit of the fluid. Thus, bearing 62 typically pumps more toward center region 63 (see FIG. 4A), to prevent fluid exit. The thrust bearings 84, 85 which are established and maintained by the patterns on the upper and lower surfaces of the thrust plate 74 and are shown for example in FIG. 4B create a pressure distribution along the upper and lower surfaces of the thrust plate to support the shaft for rotation and also to prevent tilting of the shaft within the sleeve.

Looking back at FIG. 3, the fluid is intended to fill the gap between the shaft 52 and the sleeve 40 as well as the upper and lower thrust bearing gaps 92 and 96, the region 98 between the radial end of the thrust plate and the inner surface of the sleeve, the reservoir 100 and the cross bore 101, all these forming a continuous fluid circulation path. As noted before, the pressure distribution is built up by the relative rotation between the shaft and the sleeve and between the thrust plate and the counter plate or sleeve. The reservoir 100 and cross bore 101 effectively short the pressure in the region between the upper and lower journal bearings 62, 64 to be equal to the pressure in the gap 96 between the lower thrust plate. However, it has been found that this shaft design with the center bore or reservoir 100 and cross ventilation hole 101 is expensive and raises serious quality issues such as dealing with contamination which can be present in the fluid; and burrs which may occur in machining the inner and outer diameter of the cross hole 101.

Figure 4B:
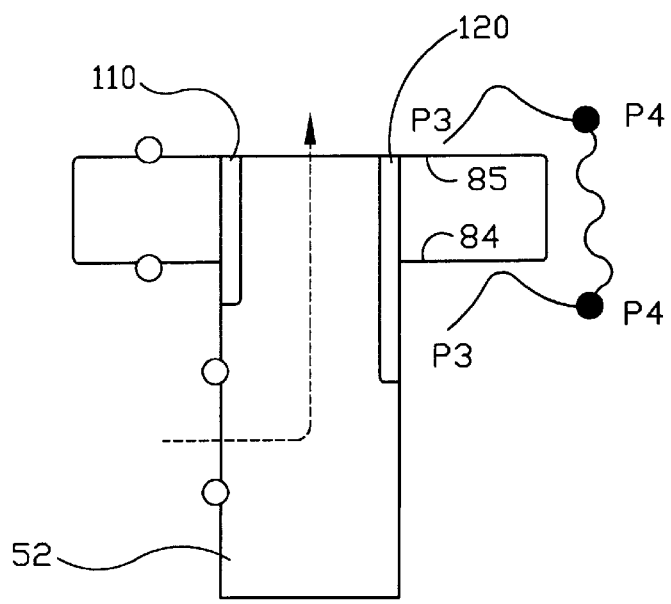

Therefore, according to the present invention, one or more grooves or slots 110 such as shown in FIG. 4B may be provided to replace the center hole 100 and cross hole 101. These grooves or slots may extend to a point adjacent to or just below the lower journal bearing 64; or may alternatively as shown on the right-hand side of FIG. 4B extend to the journal bearing area between journal bearings 62 and 64. In either case, the pressure will be equalized at the upper and lower ends of the slot 110 or 120, creating an equal pressure region between the selected point of the journal bearing and the selected region of the thrust bearing. The length of the slot is chosen to enhance the pressure distribution along the shaft and the fluids for the shaft. Although only a single slot or groove 110 or 120 is shown, a plurality of grooves or slots may be provided to optimize the pressure distribution and fluid flow. The term "groove" or "slot" may be used to indicate that the shape and depth of the slot or slots is not a critical feature and may be chosen to enhance the manufacturability and reliability of the design. Further, the grooves 110, 120 are shown here to be etched or otherwise defined in the surface of the shaft 52. However, they could as easily be formed or defined on the inner surface of the thrust plate if this simplifies the manufacturability of the design.

Other features and advantages of the present invention may be apparent to a person of skill in the art who studies the present invention disclosure. Therefore, the scope of the present invention is to be limited only by the following claims.

What is claimed is:

1. In a motor including a shaft and a housing, said housing having a sleeve for receiving said shaft, said shaft and said sleeve defining a fluid filled gap there between having a first closed end and a second open end, a hydrodynamic bearing comprising at least one set of asymmetric grooves on said shaft or sleeve aligned to establish pressure gradients in a journal bearing gap between said shaft and said sleeve along said shaft, and a thrust plate coupled to said shaft at said first closed end thereof, said thrust plate having first and second surfaces defining first and second thrust bearing gaps, said surfaces having grooves thereon to establish pressure gradients over said surfaces and in said first and second gaps and one or more slots on an outer surface of the shaft coupling said second gap of said thrust plate to said journal bearing gap so that the fluid level in the gaps is balanced and said hydrodynamic fluid remains in the bearing.

2. The hydrodynamic bearing of claim 1 wherein said one set of asymmetric grooves comprises two sections defining first and second journal bearings along said journal bearing gap, one of said two sections pumping said fluid toward said thrust plate and away from said open end, each said slots extending over said outer surface of said shaft to between said first and second journal bearings.

3. The hydrodynamic bearing of claim 1 wherein said hydrodynamic fluid forms a single capillary seal near said second open end of said shaft opposite said closed end and said thrust plate.

4. The hydrodynamic bearing of claim 1 wherein said thrust plate second gap is defined by said second thrust plate surface distal from said journal bearings.

5. The hydrodynamic bearing of claim 4 wherein said thrust plate is affixed to an end of said shaft so that said second gap is defined by said second surface of said plate and an end surface of said shaft.

6. The hydrodynamic bearing of claim 2 wherein said one or more slots extend to said journal bearing region between said first and second journal bearings.

7. The hydrodynamic bearing of claim 2 wherein said one or more slots extend to said journal bearing region adjacent said second journal bearing closer to said thrust plate.

8. A hydrodynamic bearing comprising a relatively rotating shaft and surrounding sleeve, said shaft and said sleeve defining a fluid filled gap there between, at least one set of asymmetric grooves on said shaft or sleeve aligned to establish pressure gradients in a journal bearing gap between said shaft and said sleeve along said shaft, and a thrust plate coupled to said shaft at a first closed end thereof, thrust plate having first and second surfaces defining first and second thrust bearing gaps, said surfaces having grooves thereon to establish pressure gradients over said surfaces and in said first and second gaps and one or more slots on a surface of the shaft coupling said second gap of said thrust plate to said journal bearing gap so that the fluid level in the gaps is balanced and said hydrodynamic fluid remains in the bearing.

9. The hydrodynamic bearing of claim 8 wherein said one set of asymmetric grooves comprises two sections defining first and second journal bearings along said journal bearing gap, one of said two sections pumping said fluid toward said thrust plate and away from an open end of said journal bearing gap said slots extending over said outer surface of said shaft to between said first and second journal bearings.

10. The hydrodynamic bearing of claim 8 wherein said hydrodynamic fluid forms a single capillary seal near a second open end of said shaft opposite said closed end and said thrust plate.

11. The hydrodynamic bearing of claim 8 wherein said thrust plate is affixed to an end of said shaft so that said second gap is defined by said second surface of said plate and an end surface of said shaft.

12. The hydrodynamic bearing of claim 9 wherein said one or more slots extend to said journal bearing region adjacent said second journal bearing closer to said thrust plate.

13. A hydrodynamic bearing comprising a relatively rotating shaft and surrounding sleeve, said shaft and said sleeve defining a fluid filled gap therebetween, the shaft supporting a thrust plate at or near one end thereof, the shaft having first and second journal bearings supporting said shaft and sleeve for the relative rotation, and means defined on a surface of the shaft for coupling a thrust bearing defined by said thrust plate distal from said journal bearing to a region intermediate the pair of journal bearings to equalize the pressure between the thrust bearing and the journal bearing.

* * * * *